United States Patent
Li

(10) Patent No.: US 9,779,552 B2
(45) Date of Patent: Oct. 3, 2017

(54) INFORMATION PROCESSING METHOD AND APPARATUS THEREOF

(71) Applicant: Lenovo (Beijing) Co., Ltd., Beijing (CN)

(72) Inventor: Ligang Li, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 0 days.

(21) Appl. No.: 14/753,877

(22) Filed: Jun. 29, 2015

(65) Prior Publication Data

US 2016/0260257 A1 Sep. 8, 2016

(30) Foreign Application Priority Data

Mar. 2, 2015 (CN) .......................... 2015 1 0093085

(51) Int. Cl.
| | |
|---|---|
| *G06T 19/00* | (2011.01) |
| *G02B 27/01* | (2006.01) |
| *G06K 9/46* | (2006.01) |
| *G06K 9/62* | (2006.01) |
| *G06T 7/00* | (2017.01) |

(52) U.S. Cl.
CPC ........ *G06T 19/006* (2013.01); *G02B 27/0172* (2013.01); *G02B 27/017* (2013.01); *G02B 2027/014* (2013.01); *G02B 2027/0178* (2013.01); *G06K 9/46* (2013.01); *G06K 9/6201* (2013.01); *G06T 7/00* (2013.01)

(58) Field of Classification Search
None
See application file for complete search history.

(56) References Cited

U.S. PATENT DOCUMENTS

| | | | |
|---|---|---|---|
| 8,401,225 B2* | 3/2013 | Newcombe | G06T 7/2006 382/100 |
| 2002/0075286 A1 | 6/2002 | Yonezawa et al. | |

(Continued)

FOREIGN PATENT DOCUMENTS

CN 101243392 A 8/2008

OTHER PUBLICATIONS

First Chinese Office Action regarding Application No. 201510093085.7 dated Mar. 31, 2017. English translation provided by http://globaldossier.uspto.gov.

*Primary Examiner* — Mark Zimmerman
*Assistant Examiner* — Yu-Jang Tswei
(74) *Attorney, Agent, or Firm* — Harness, Dickey & Pierce, P.L.C.

(57) ABSTRACT

An information processing method and an apparatus thereof are provided, which are applicable to a head-mounted device with a display unit. The information processing method includes: determining a virtual vision area for a user in a case that the user wears the head-mounted device; searching an environment space for a first object which is located in the virtual vision area and satisfies a predetermined condition; determining a first display area of the display unit which matches the first object; and outputting first display content in the first display area, such that when the user watches the display unit, the user sees that the first display content is presented on the first object in the virtual vision area. Display effect of the head-mounted device is improved according to the embodiments of the disclosure.

9 Claims, 6 Drawing Sheets

(56) References Cited

U.S. PATENT DOCUMENTS

| | | | |
|---|---|---|---|
| 2005/0168486 A1* | 8/2005 | Sato | A63F 13/10 345/633 |
| 2010/0164990 A1 | 7/2010 | Van Doorn | |
| 2011/0140994 A1 | 6/2011 | Noma | |
| 2015/0091780 A1* | 4/2015 | Lyren | G02B 27/017 345/8 |
| 2016/0018643 A1* | 1/2016 | Cho | G02B 27/0172 345/8 |

* cited by examiner

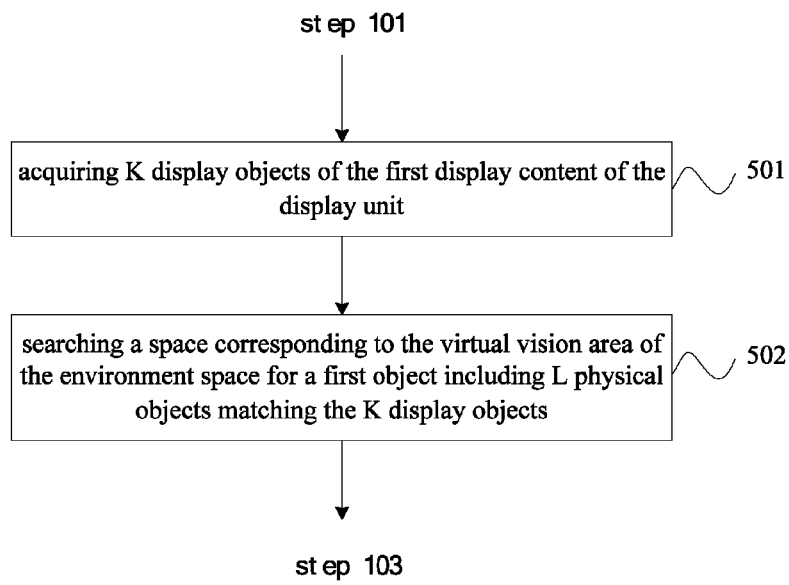
Fig. 5
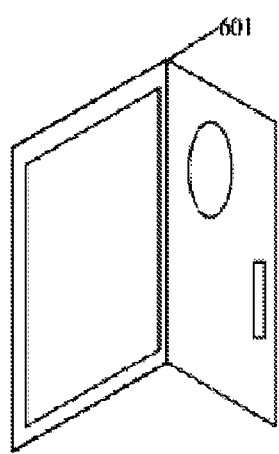  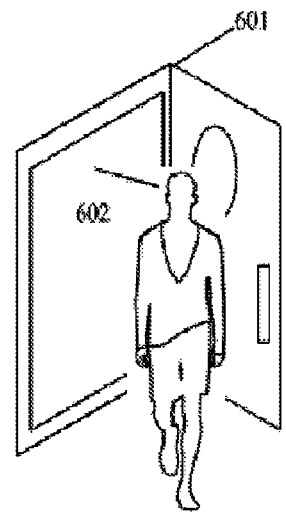
Fig. 6a      Fig. 6b      Fig. 6c

INFORMATION PROCESSING METHOD AND APPARATUS THEREOF

CROSS REFERENCE TO RELATED APPLICATIONS

The present application claims the priority to Chinese Patent Application No. 201510093085.7, entitled "INFORMATION PROCESSING METHOD AND APPARATUS THEREOF", filed on Mar. 2, 2015 with the State Intellectual Property Office of People's Republic of China, which is incorporated herein by reference in its entirety.

FIELD

The present disclosure relates to the field of electronic technology, and in particular to an information processing method and an apparatus thereof.

BACKGROUND

A head-mounted smart advice refers to a smart device, such as a pair of smart glasses, developed by intelligently designing a head-mounted device by using the wearable technology.

For a head-mounted smart advice with a display unit, when wearing it, a user may view display content output by the display unit. Since the vision imaging space for the display content viewed by the user is different from the display interface of the display unit, the vision imaging space for the display content viewed by the user is a virtual vision space. From the vision of the user, the display content viewed by the user is virtual content, and the virtual content is superimposed to the real environment viewed by the user, thereby achieving the display effect of combination of virtuality and reality.

The display effect of combination of virtuality and reality may be achieved, however, the real environment for superimposition can not be selected or changed, and display effect is simple and not good.

SUMMARY

An information processing method applicable to a head-mounted device with a display unit is provided, which includes:
determining a virtual vision area for a user in a case that the user wears the head-mounted device;
searching an environment space for a first object which is located in the virtual vision area and satisfies a predetermined condition;
determining a first display area of the display unit which matches the first object; and
outputting first display content in the first display area, such that when the user watches the display unit, the user sees that the first display content is presented on the first object in the virtual vision area.

An information processing apparatus applicable to a head-mounted device with a display unit is provided, which includes:
a first area determining module, configured to determine a virtual vision area for a user in a case that the user wears the head-mounted device;
a first searching module, configured to search an environment space for a first object which is located in the virtual vision area and satisfies a predetermined condition;
a second area determining module, configured to determine a first display area of the display unit which matches the first object; and
a first outputting module, configured to output first display content in the first display area, such that when the user watches the display unit, the user sees that the first display content is presented on the first object in the virtual vision area.

BRIEF DESCRIPTION OF THE DRAWINGS

To describe the technical solutions for embodiments of the present disclosure or technical solutions in conventional technology more clearly, the following briefly describes the drawings involved in the embodiments of the present disclosure or in the conventional technology. Apparently, the drawings described below are only embodiments of the disclosure, and persons of ordinary skill in the art can derive other drawings according to the drawings without any creative effort.

FIG. 5 is a flowchart of an information processing method according to another embodiment of the present disclosure;

FIG. 6a to FIG. 6c are schematic diagrams showing a display effect of combination of virtuality and reality according to an embodiment of the present disclosure;

DETAILED DESCRIPTION

Technical solutions of the embodiments of the present disclosure will be illustrated completely and clearly with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, a virtual vision area for a user is determined in a case that the user wears the head-mounted device. An environment space is searched for a first object satisfying a predetermined condition in the virtual vision area. A first display area of the display unit which matches the first object is determined. Thus first display content is output in the first display area, such that when the user watches the display unit, the user sees that the first display content is presented on the first object in the virtual vision area. In the embodiments of the disclosure, an object satisfying the predetermined condition may be selected as the real environment for superimposition in the environment space, such that the first display content can be displayed on the first object in the environment space and in outputting the content, objects in the environment space are considered and are selectable, without only passively superimposing display content to an environment space where the user is located, thus combination of virtuality and reality has an improved display effect and is more targeted, and the user experience is improved.

The embodiments of the present disclosure are described in detail in conjunction with the drawings as follows.

Figure 1:
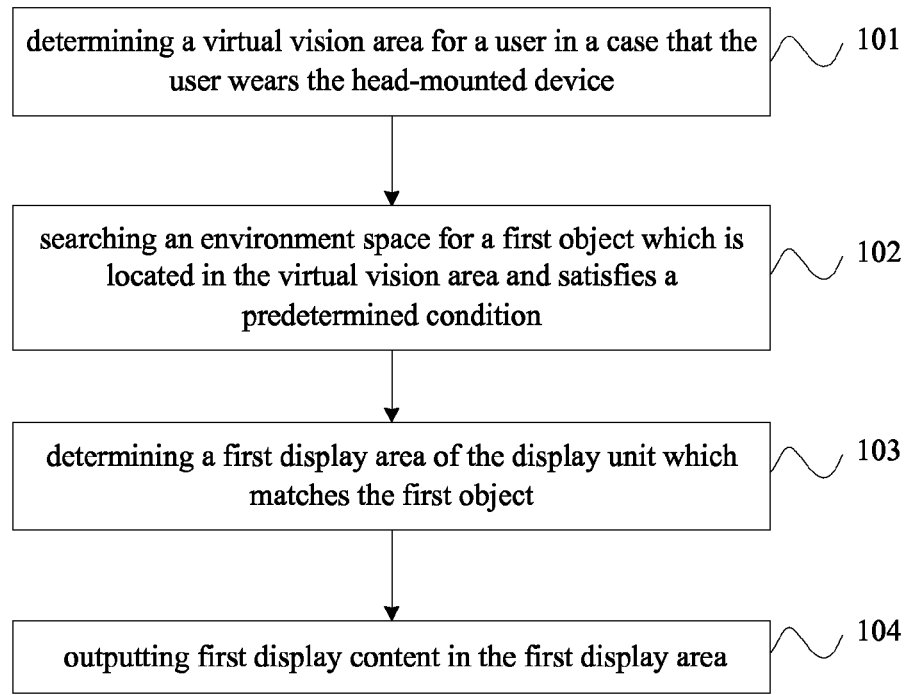
FIG. 1 is a flowchart of an information processing method according to an embodiment of the present disclosure.

FIG. 1 is a flowchart of an information processing method according to an embodiment of the present disclosure. The technical solutions of the embodiment are applicable to a head-mounted device with a display unit.

The method may include step 101 to step 104.

In Step 101, a virtual vision area for a user is determined in a case that the user wears the head-mounted device.

In Step 102, an environment space is searched for a first object which is located in the virtual vision area and satisfies a predetermined condition.

In Step 103, a first display area of the display unit, which matches the first object, is determined.

In Step 104, first display content is output in the first display area, such that when a user watches the display unit, the user sees that the first display content is presented on the first object in the virtual vision area.

While wearing a head-mounted smart device, the user may view display content output by the display unit. Since when the user view the display unit, the vision imaging space is different from the display interface of the display unit, the vision imaging space corresponding to the display unit viewed by the user is the virtual vision space. From the visual angle of the user, the display content viewed by the user is virtual content, which is superimposed to the actual environment viewed by the user, thereby achieving combination of virtuality and reality.

In the embodiment, the environment space refers to the environment currently around the user. The virtual vision area is a display area corresponding to the display unit watched by the user in the environment space. The virtual vision area may be understood as a portion of the environment space, which is determined by the vision imaging space of the user.

Since the display unit corresponds to the virtual vision area, the first display area in the display unit, which matches the first object, may be determined according to the display position of the first object in the virtual vision area.

Therefore, in the embodiment of the disclosure, the first display content may be output in the first display area of the display unit, such that when watching the display unit, the user sees that the first display content is presented on the first object in the virtual vision area according to the visual imaging principle.

In the embodiment of the disclosure, the first object in the virtual vision area of the environment space is determined, that is, the first object can be seen by the user, the first display content of the display unit may be displayed in the first display area that matches the first object and virtual content of the first display content may be superimposed on the first object. According to the embodiment of the disclosure, the combination of virtuality and reality has an improved effect, and is more targeted, and thereby improving the display effect of the head-mounted device.

Figure 2:
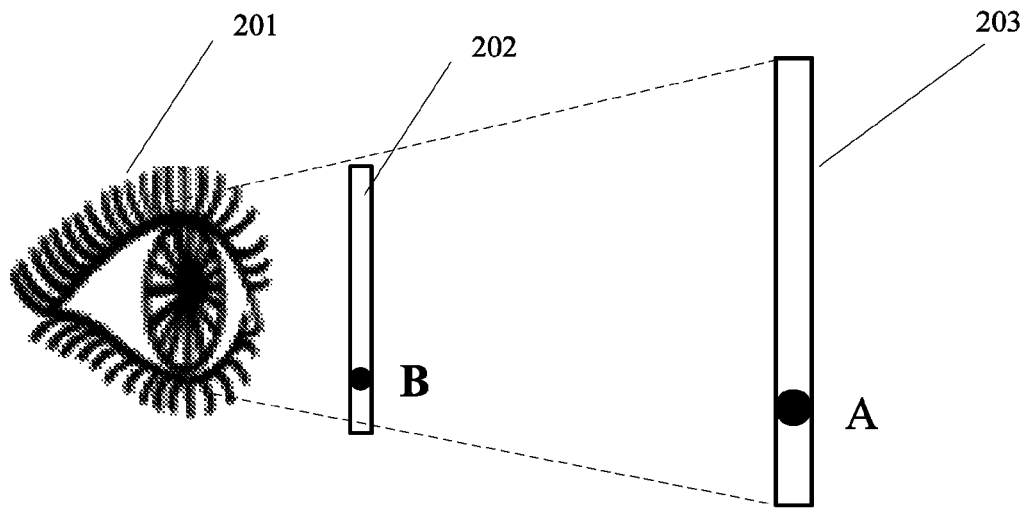
FIG. 2 is a diagram that shows imaging principle of a head-mounted device according to an embodiment of the present disclosure.

The virtual vision area is the vision imaging space of the user corresponding to the display unit. FIG. 2 shows a schematic diagram of visual imaging, while a user 201 views display content of the display unit 202, according to the visual imaging principle the viewed display content is virtual content, which is superimposed to the actual environment viewed by the user, i.e., the virtual vision area 203 in the environment space, thus achieving the combination of virtuality and reality.

It can be seen from FIG. 2 that there is a correspondence between the virtual vision area and the display unit.

Therefore, the determining the first display area of the display unit which matches the first object may include:

determining a correspondence between the display unit and the virtual vision area;

determining a spatial position of the first object in the virtual vision area; and determining a display area of the display unit corresponding to the spatial position as the first display area according to the spatial position and the correspondence between the display unit and the virtual vision area.

In FIG. 2, for example, a first object A in the virtual vision area corresponds to a first display area B of the display unit.

The correspondence between the display unit and the virtual vision area may be expressed as a mathematic formula, and a first display area corresponding to a first object may be obtained by a mathematic operation.

The first display content may be a display object which satisfies a specific condition and is output by the display unit.

The specific condition may be determined as required.

The first display content may alternatively be content selected by a user from the content output by the display unit.

Specifically, pupil information of a user may be collected for analysis, and content, on which the vision of the user is focused, is the first display content, thus further improving the user experience.

Alternatively, action information of an operator, such as gesture information of the user, may be collected in the virtual vision area to determine content operated by the operator as the first display content.

In addition, the first display content may alternatively be abbreviated content of the content output by the display unit. Thus, after the first display area is determined, the first display content may be only displayed in the first display area, and the display area of the display unit other than the first display area does not output content, or is blank or transparent.

Apparently, the first display content may alternatively be content, which is determined from the content output by the display unit and matches the first object after the first object is determined.

Figure 3:
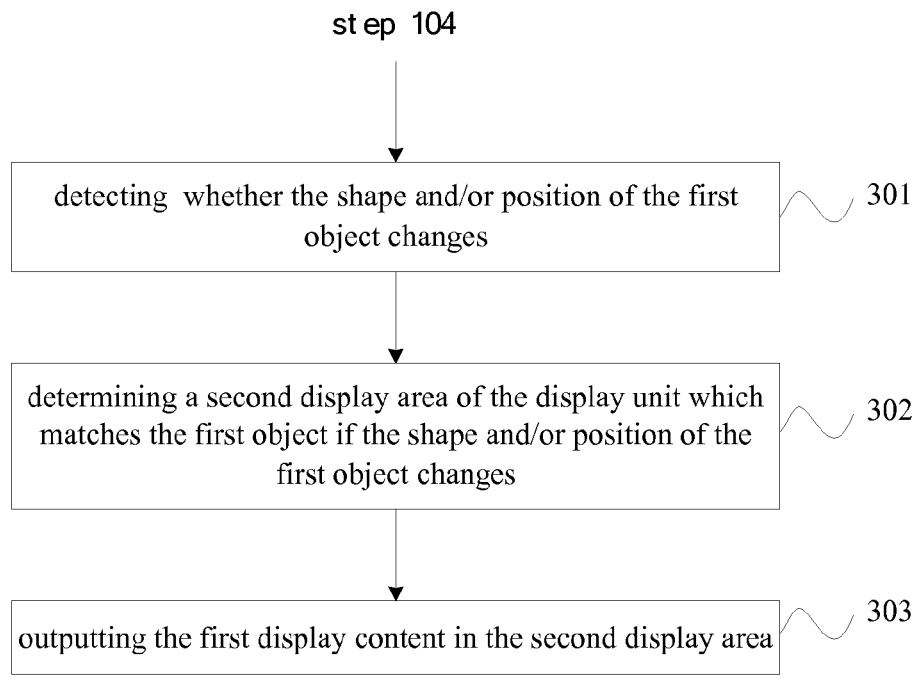
FIG. 3 is a flowchart of an information processing method according to another embodiment of the present disclosure.

The first object in the environment space may be movable or deformable, and the user wearing the head-mounted device may move such that a relative position of the first object in the virtual vision area may change. Therefore, as shown in FIG. 3, in another embodiment of the disclosure, after step 104, i.e., after outputting the first display content in the first display area, the method may further include step 301 to step 303.

In step 301, whether the shape and/or position of the first object changes is detected.

In step 302, a second display area of the display unit which matches the first object is determined if the shape and/or position of the first object changes.

In step 303, the first display content is output in the second display area, such that when the user watches the display unit, the user sees that the first display content is presented on the first object in the virtual vision area.

If the shape and/or position of the first object changes, the area of the display unit which matches the first object changes correspondingly. In this case, the second display area of the display unit which matches the first object may be determined, such that the first display content can be displayed in the second display area, thus when the user watches the display unit, the user sees that the first display content is still presented on the first object in the virtual vision area. Therefore, the display effect of combination of virtuality and reality is not affected.

Whether the shape and/or position of the first object changes may refer to whether the shape and/or position of the first object relative to the virtual vision area changes. For example, the first object is fixed in the environment space, if the virtual vision area changes due to a movement of the user, the relative position of the first object changes.

Since the area of the display unit which matches the first object may be determined according to the spatial position of the first object in the virtual vision area, whether the position of the first object changes may refer to whether the spatial position of the first object in the virtual vision area changes.

Therefore, after the shape and/or position of the first object changes, the second display area of the display unit which matches the spatial position of the first object in the virtual vision area may be determined according to the spatial position of the first object in the virtual vision area and a correspondence between the display unit and the virtual vision area.

In the embodiment, the first display content may be presented on the first object. Furthermore, in a case that the shape and/or position of the first object changes, it may be ensured that the first display content is still presented on the first object. In this way, the first display content may be superimposed on an object moving in the environment space thereby further improving the display effect of combination of virtuality and reality and improving the user experience.

Figure 4:
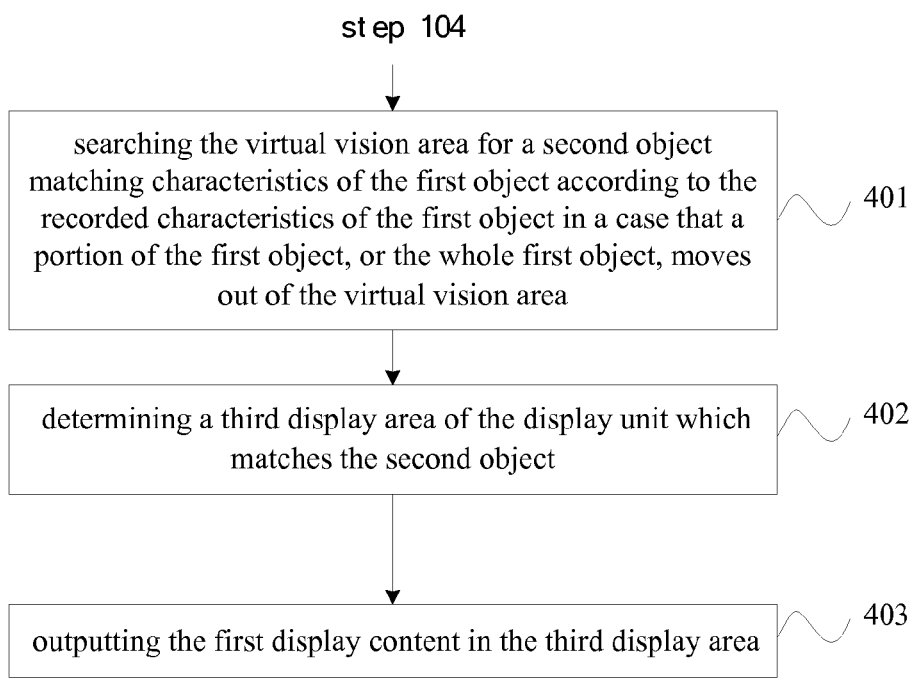
FIG. 4 is a flowchart of an information processing method according to another embodiment of the present disclosure.

Due to a movement of the first object or a movement of the user, the first object may move out of the virtual vision area, and cannot be tracked, or a portion of the first object moves out of the virtual vision area and the first object can not be identified. Therefore, another embodiment is provided, and as shown in FIG. 4, after step 104, that is, after outputting the first display content in the first display area, the method further includes steps 401 to 403.

In Step 401, the virtual vision area is searched for a second object matching characteristics of the first object according to recorded characteristics of the first object in a case that a portion of the first object, or the whole first object, moves out of the virtual vision area.

In step 402, a third display area of the display unit which matches the second object is determined.

In step 403, the first display content is output in the third display area, such that when the user watches the display unit, the user sees that the first display content is presented on the second object in the virtual vision area.

The second object matching characteristics of the first object may be the first object. That is, the first object may moves into the virtual vision area after moving out of the virtual vision area. In this case, the first display content may still be presented on the first object, thereby ensuring the display effect of combination of virtuality and reality.

The characteristics of the first object may include textural features, and size, etc.

In a case that the first object is still in the virtual vision area and the position or shape of the first object changes relative to the virtual vision area, the processing method according to the embodiment shown in FIG. 3 may be performed, to ensure that the display effect of combination of virtuality and reality is achieved for the moving first object and thus improving the display effect.

As described in the above embodiments, the first object is an object satisfying a predetermined condition which is located in the virtual vision area of the environment space.

In a possible implementation:

the predetermined condition may refer to a predetermined shape, a predetermined size, or a predetermined texture, etc. That is, the first object is an object having the predetermined shape, the predetermined texture or other features, such as a display screen, a piece of paper, a desktop.

In another possible implementation:

the predetermined object may alternatively be an object selected by the user.

Since the user may view a real object in the virtual vision area, the user may designate the first object to be superimposed by the first display content through action information such as a gesture. The head-mounted device may determine the first object in the virtual vision area of the environment space which is designated by the user, by collecting the action information of the user.

In still another possible implementation:

the predetermined condition may refer to matching the first display content. That is, the predetermined condition may refer to that the first object matches the first display content, for example, size match or shape match. Thus, the first display content may be merged with the first object such that both the first display content and the first object are output by the display unit from the vision of the user, thereby further improving the display effect of combination of virtuality and reality and improving the user experience. For example, the first display content is a cup, and a desk in the virtual vision area may be selected as the first object. Thus, from the vision of the user, the virtual content, i.e., the cup, is superimposed to the real object, i.e., the desk, such that the user believe that the cup is placed on the desk.

For another example, in the case that the first object is a display screen, the display effect that the real object, i.e., the display screen, displays virtual content may be achieved.

Therefore, in another embodiment, as shown in FIG. 5, a technical solution is described in detail for the step 102 of searching the virtual vision area of the environment space for the first object satisfying the predetermined condition, and the other steps may refer to the description according to the above embodiments.

The step 102 may include following steps 501 and 502.

In step 501, K display objects of the first display content of the display unit are acquired where K is an integer greater than or equal to 1;

In step 502, a space corresponding to the virtual vision area of the environment space is searched for a first object including L physical objects matching the K display objects where L is an integer greater than or equal to 1.

Thus, in a case that the first display area of the display unit which matches the first object is determined, and the first display content is output in the first display area, the user may see from the display unit that in the virtual vision area, the first content is presented on the first object, and the first object and the K displayed objects are merged with the L physical objects.

With this embodiment, the display effect of combination of virtuality and reality is further improved, the environment for superimposition can be selected or changed, and the display effect is improved.

An example is taken below for better understanding that the K displayed objects are merged with the L physical objects.

FIG. 6a shows content output by the display unit, in which the first display content 601 includes one display object, i.e. an opened door.

In FIG. 6b, the first object 602 is a physical object which is a moving man.

FIG. 6c shows the display effect of combination of virtuality and reality for merging the displayed object and the physical object in a case that the first display content is output in the first display area. Thus, a display effect that a man walks out of the door can be obtained.

Since the man is moving, the second display area of the display unit which matches the man may further be adjusted according to the change of the position of the man and the technical solution shown in FIG. 3, to change the display area for the door in real time.

The case that both K and L are equal to 1 is taken as an example for description herein, but the present disclosure is not limited to the case.

For example, the K display objects in the first display content are multiple fishes, and the L physical object of the first object is a fishbowl. Thus, the display effect that the virtual fishes are merged with the real fishbowl is achieved, thereby achieving the presentation that the virtual fishes are in the real fishbowl.

For foregoing method embodiments, to simplify description, the method are illustrated as a combination of a series of actions, but persons of skill in the art should know that the disclosure is not limited to the sequence of the described actions, since according to the disclosure, some steps may be performed in a different sequence or performed simultaneously. The persons of skill in the art should also know that the embodiments described in specifications all belong to preferred embodiments, and the relevant actions and modules may not necessary according to the disclosure.

Figure 7:
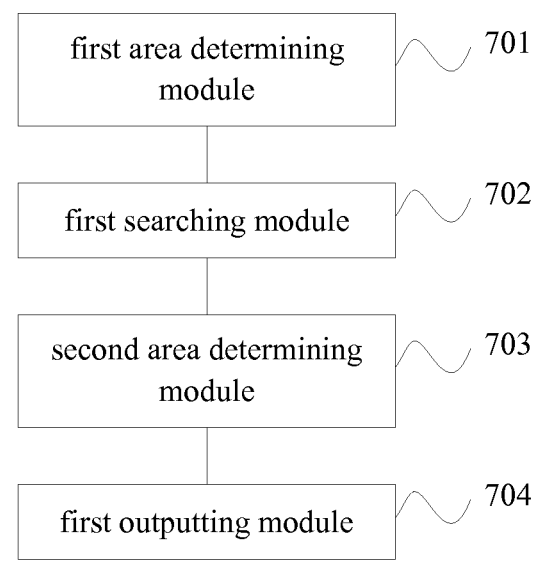
FIG. 7 is a structural schematic diagram of an information processing apparatus according to an embodiment of the present disclosure.

FIG. 7 is a structural schematic diagram of an information processing apparatus according to an embodiment of the present disclosure. The information processing apparatus is applicable to a head-mounted device, that is, the information processing apparatus may be integrated, as a realizable function of a processor, in a processor of the head-mounted device or is connected, as an independent module, to the processor.

The head-mounted device has a display unit.

The information processing apparatus includes:

a first area determining module 701, configured to determine a virtual vision area for a user in a case that the user wears the head-mounted device;

a first searching module 702, configured to search an environment space for a first object which is located in the virtual vision area and satisfies a predetermined condition;

a second area determining module 703, configured to determine a first display area of the display unit which matches the first object; and a first outputting module 704, configured to output first display content in the first display area, such that when a user watches the display unit, the user sees that the first display content is presented on the first object in the virtual vision area.

Therefore, in the embodiment of the disclosure the first display content may be output in the first display area of the display unit, such that when watching the display unit, the user sees that the first display content is presented on the first object in the virtual vision area according to the visual imaging principle.

In the embodiment of the disclosure, the first object in the virtual vision area of the environment space, i.e., the first object which can be seen by the user, is determined, the first display content of the display unit may be displayed in the first display area that matches the first object, and virtual content of the first display content may be superimposed on the first object. According to the embodiment of the disclosure, the combination of virtuality and reality has an improved effect, and is more targeted, and thereby improving the display effect of the head-mounted device.

Since the virtual vision area is the vision imaging space of the user corresponding to the display unit, the virtual vision area has a correspondence with the display unit. Thus, in an possible implementation, the second area determining module may include:

a relation determining unit, configured to determine a correspondence between the display unit and the virtual vision area;

a position determining unit, configured to determine a spatial position of the first object in the virtual vision area; and an area determining unit, configured to determine a display area of the display unit corresponding to the spatial position as the first display area according to the spatial position and the correspondence between the display unit and the virtual vision area.

The first display content may be a display object which satisfies a specific condition and is output by the display unit.

The specific condition may be determined as required.

The first display content may alternatively be content selected by a user from the content output by the display unit.

Specifically, pupil information of the user may be collected for analysis, and content, on which the vision of the user is focused, is the first display content, thus further improving the user experience.

Alternatively, action information of an operator, such as gesture information of a user, may be collected in the virtual vision area to determine content operated by the operator as the first display content.

In addition, the first display content may alternatively be abbreviated content of the content output by the display unit. Thus, after the first display area is determined, the first display content may be only displayed in the first display area, and the display area of the display unit other than the first display unit does not output content, or is blank or transparent.

Apparently, the first display content may alternatively be content, which is determined from the content output by the display unit and matches the first object after the first object is determined.

Figure 8:
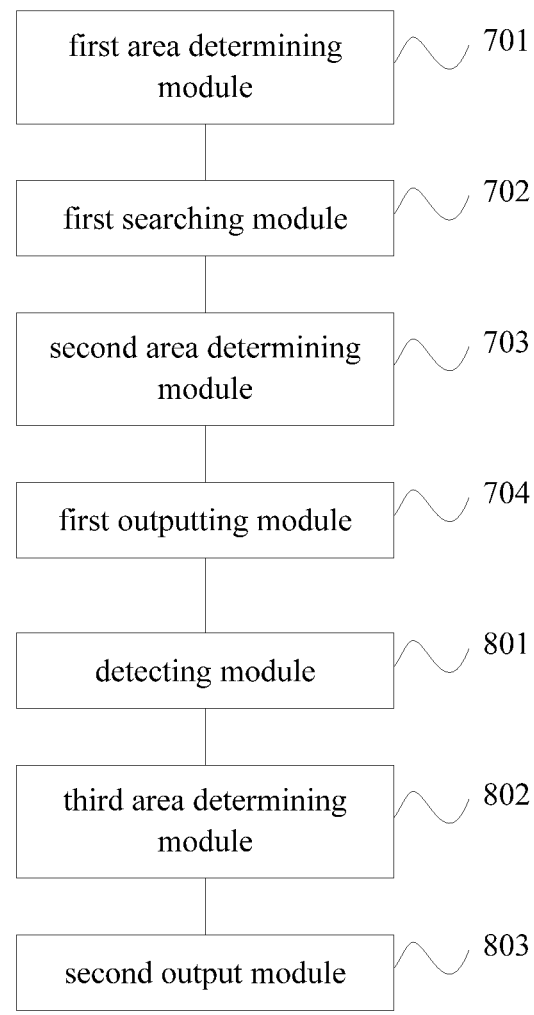
FIG. 8 is a structural schematic diagram of an information processing apparatus according to another embodiment of the present disclosure.

The first object in the environment space may be movable or deformable, and the user wearing the head-mounted device may move such that a relative position of the first object in the virtual vision area may change. Therefore, as shown in FIG. 8, in another embodiment of the disclosure, the information processing apparatus may further include:

a detecting module 801, configured to detect whether the shape and/or position of the first object changes;

a third area determining module 802, configured to determine a second display area of the display unit which matches the first object if the shape and/or position of the first object changes; and a second output module 803, configured to output the first display content in the second display area, such that when the user watches the display unit, the user sees that the first display content is presented on the first object in the virtual vision area.

Whether the shape and/or position of the first object changes may refer to whether the shape and/or position of the first object relative to the virtual vision area changes. For example, the first object is fixed in the environment space, if the virtual vision area changes due to a movement of the user, the relative position of the first object changes.

Since the area of the display unit which matches the first object may be determined according to the spatial position of the first object in the virtual vision area, whether the position of the first object changes may refer to whether the spatial position of the first object in the virtual vision area changes.

Therefore, after the shape and/or position of the first object changes, the second display area of the display unit which matches the spatial position of the first object in the virtual vision area may be determined according to the spatial position of the first object in the virtual vision area and the correspondence between the display unit and the virtual vision area.

In the embodiment, the first display content may be presented on the first object. Furthermore, in a case that the shape and/or position of the first object changes, it may be ensured that the first display content is still presented on the first object. In this way, the first display content may be superimposed on an object moving in the environment space thereby further improving the display effect of combination of virtuality and reality and improving the user experience.

Figure 9:
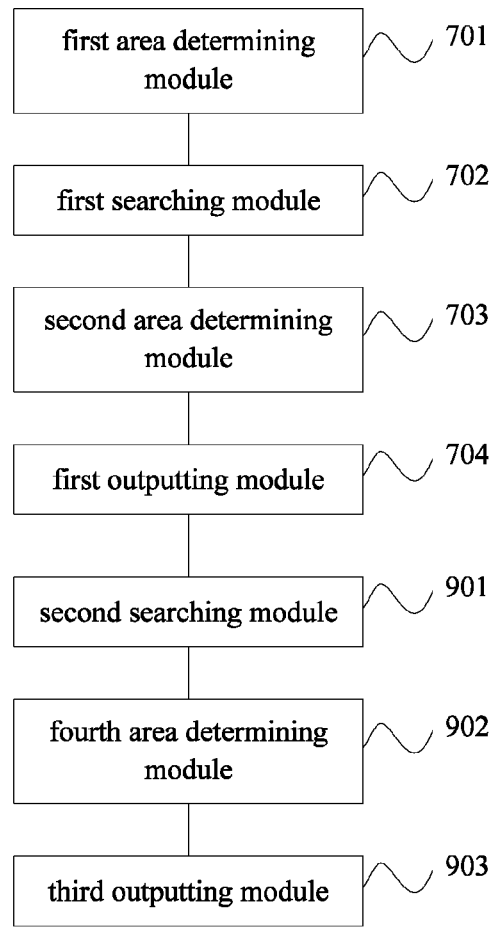
FIG. 9 is a structural schematic diagram of an information processing apparatus according to another embodiment of the present disclosure.

Due to a movement of the first object or a movement of the user, the first object may move out of the virtual vision area, and cannot be tracked, or a portion of the first object moves out of the virtual vision area and the first object can not be identified. Therefore, another embodiment is provided, and as shown in FIG. 9, the information processing apparatus may further include:

a second searching module 901, configured to search, according to recorded characteristics of the first object, the virtual vision area for a second object matching the characteristics of the first object in a case that a portion of the first object or the whole first object moves out of the virtual vision area;

a fourth area determining module 902, configured to determine a third display area of the display unit which matches the second object; and a third outputting module 903, configured to output the first display content in the third display area, such that when the user watches the display unit, the user sees that the first display content is presented on the second object in the virtual vision area.

The second object matching the characteristics of the first object may be the first object. That is, the first object may moves into the virtual vision area after moving out of the virtual vision area. In this case, the first display content may still be presented on the first object, thereby ensuring the display effect of combination of virtuality and reality.

The characteristics of the first object may include textural features, and size, etc.

In a case that the first object is still in the virtual vision area and the position or shape of the first object changes relative to the virtual vision area, the processing method according to the embodiment shown in FIG. 3 may be performed, to ensure that the display effect of combination of virtuality and reality is achieved for the moving first object and thus improving display effect.

In the above embodiments, the first object is an object satisfying a predetermined condition which is located in the virtual vision area of the environment space. In a possible implementation:

the predetermined condition may refer to a predetermined shape, a predetermined size, or a predetermined texture, etc. That is, the first object is an object having the predetermined shape, the predetermined texture or other features, such as a display screen, a piece of paper, a desktop.

In another possible implementation:

the predetermined object may alternatively be an object selected by the user.

Since the user may view a real object in the virtual vision area, the user may designate the first object to be superimposed by the first display content through action information such as a gesture. The head-mounted device may determine the first object in the virtual vision area of the environment space which is designated by the user, by collecting the action information of the user.

In still another possible implementation:

the predetermined condition may refer to matching the first display content. That is, the predetermined condition may refer to that the first object matches the first display content.

Figure 10:
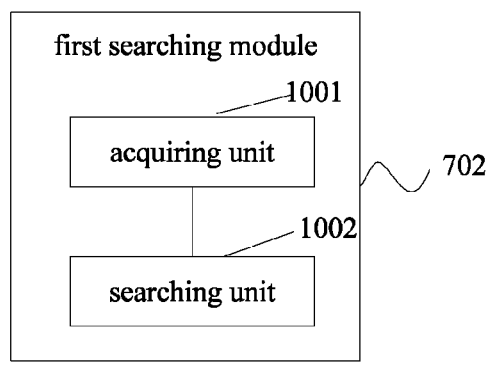
FIG. 10 is a structural schematic diagram of a first searching module of an information processing apparatus according to another embodiment of the present disclosure.

Therefore, as shown in FIG. 10, in another embodiment, the first searching module 702 may include:

an acquiring unit 1001, configured to acquire K display objects of the first display content on the display unit where K is an integer greater than or equal to 1; and a searching unit 1002, configured to search a space corresponding to the virtual vision area of the environment space for an object including L physical objects matching the K display objects such that when the first output module outputs the first display content in the first display area, and the user watches the display unit, the user sees that the first display content is presented on the first object and the K displayed objects are merged with the L physical objects, where K is an integer greater than or equal to 1, and L is an integer greater than or equal to 1.

With this embodiment, the display effect of combination of virtuality and reality is further improved, the environment for superimposition can be selected or changed, and the user experience is improved.

The embodiments of the present disclosure are described in a progressive manner and each embodiment places emphasis on the difference from other embodiments, therefore, one embodiment can refer to other embodiments for the same or similar parts. For the apparatus disclosed in the embodiments, since the apparatus corresponds to the method disclosed in the embodiments, the description is relatively simple, and relevant part of the description may refer to the description according to the method embodiments.

It should be noted that, a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", such that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

According to the description of the disclosed embodiments, the disclosure may be implemented or used by the persons of skill in the art. Various modifications made to these embodiments are apparent for the persons of skill in the art, and a normal principle defined in the disclosure may be implemented in other embodiments without departing from spirit or scope of the disclosure. Therefore the disclosure is not limited to the embodiments described in the disclosure but confirms to a widest scope in accordance with principles and novel features disclosed in the disclosure.

What is claimed is:

1. An information processing method comprising:
   determining a virtual vision area for a user in a case that the user wears a head-mounted device, wherein the virtual vision area is an area where a real object is located, and in a visual direction of the user, a projection of the virtual vision area is enclosed within a display area of a display unit of the head-mounted device;
   searching an environment space for a first object which is located in the virtual vision area and satisfies a predetermined condition;
   determining a first display area of the display unit of the head-mounted device which matches the first object, wherein in the visual direction of the user, a projection of the first display area with respect to the first object is within a surface of the first object;
   outputting first display content in the first display area, such that when the user watches the display unit, the user sees that the first display content is presented on the first object in the virtual vision area;
   detecting whether a shape and/or a position of the first object changes;
   determining a second display area of the display unit which matches the first object if the shape and/or the position of the first object changes, wherein in the visual direction of the user, a projection of the second display area with respect to the first object is within the surface of the first object with the changed shape and/or position;
   outputting the first display content in the second display area, such that when the user watches the display unit, the user sees that the first display content is presented on the first object in the virtual vision area; and
   in response to a portion of the first object, or the whole first object, moving out of the virtual vision area:
      searching, according to recorded characteristics of the first object, the virtual vision area for a second object matching characteristics of the first object;
      determining a third display area of the display unit which matches the second object; and
      outputting the first display content in the third display area, such that when the user watches the display unit, the user sees that the first display content is presented on the second object in the virtual vision area.

2. The information processing method according to claim 1, wherein the determining the first display area of the display unit which matches the first object comprises:
   determining a correspondence between the display unit and the virtual vision area;
   determining a spatial position of the first object in the virtual vision area; and
   determining a display area of the display unit corresponding to the spatial position as the first display area according to the spatial position and the correspondence between the display unit and the virtual vision area.

3. The information processing method according to claim 1, wherein, the outputting first display content in the first display area, such that when the user watches the display unit, the user sees that the first display content is presented on the first object in the virtual vision area, the method further comprises:
   searching, according to recorded characteristics of the first object, the virtual vision area for a second object matching characteristics of the first object in a case that a portion of the first object, or the whole first object, moves out of the virtual vision area;
   determining a third display area of the display unit which matches the second object; and
   outputting the first display content in the third display area, such that when the user watches the display unit, the user sees that the first display content is presented on the second object in the virtual vision area.

4. The information processing method according to claim 1, wherein the searching an environment space for a first object which is located in the virtual vision area and satisfies a predetermined condition comprises:
   acquiring K display objects of the first display content of the display unit; and
   searching a space corresponding to the virtual vision area of the environment space for a first object including L physical objects matching the K display objects, such that the first display content is output in the first display area, the user may see from the display unit that in the virtual vision area, the first content is presented on the first object, and the K displayed objects are merged with the L physical objects where K is an integer greater than or equal to 1, and L is an integer greater than or equal to 1.

5. The information processing method according to claim 1, wherein the searching, according to recorded characteristics of the first object, the virtual vision area for the second object matching characteristics of the first object comprises:
   in response to the first object moving into the virtual vision area after the first object moves out of the virtual vision area, determining the first object as the second object.

6. An information processing apparatus applicable to a head-mounted device with a display unit, comprising at least one processor and a memory having processor-executable instructions stored therein, and the instructions when executed by the at least one processor, configure the apparatus to:
   determine a virtual vision area for a user in a case that the user wears the head-mounted device, wherein the virtual vision area is an area where a real object is located, and in a visual direction of the user, a projection of the virtual vision area is enclosed within a display area of the display unit of the head-mounted device;
   search an environment space for a first object which is located in the virtual vision area and satisfies a predetermined condition;
   determine a first display area of the display unit which matches the first object, wherein in a visual direction of the user, a projection of the first display area with respect to the first object is within a surface of the first object;

output first display content in the first display area, such that when a user watches the display unit, the user sees that the first display content is presented on the first object in the virtual vision area;

detect whether a shape and/or a position of the first object changes;

determine a second display area of the display unit which matches the first object if the shape and/or the position of the first object changes, wherein in the visual direction of the user, a projection of the second display area with respect to the first object is within the surface of the first object with the changed shape and/or position;

output the first display content in the second display area, such that when the user watches the display unit, the user sees that the first display content is presented on the first object in the virtual vision area; and in response to a portion of the first object, or the whole first object, moving out of the virtual vision area:
  search, according to recorded characteristics of the first object, the virtual vision area for a second object matching the characteristics of the first object;
  determine a third display area of the display unit which matches the second object; and
  output the first display content in the third display area, such that when the user watches the display unit, the user sees that the first display content is presented on the second object in the virtual vision area.

7. The information processing apparatus according to claim 6, wherein the apparatus is further configured to
determine a correspondence between the display unit and the virtual vision area;
determine a spatial position of the first object in the virtual vision area; and
determine a display area of the display unit corresponding to the spatial position as the first display area according to the spatial position and the correspondence between the display unit and the virtual vision area.

8. The information processing apparatus according to claim 6, wherein the apparatus is further configured to:
search, according to recorded characteristics of the first object, the virtual vision area for a second object matching the characteristics of the first object in a case that a portion of the first object or the whole first object moves out of the virtual vision area;
determine a third display area of the display unit which matches the second object; and
output the first display content in the third display area, such that when the user watches the display unit, the user sees that the first display content is presented on the second object in the virtual vision area.

9. The information processing apparatus according to claim 6, wherein the apparatus is further configured to:
acquire K display objects of the first display content on the display unit wherein K is an integer greater than or equal to 1; and
search a space corresponding to the virtual vision area of the environment space for an object including L physical objects matching the K display objects such that when the first display content is output in the first display area, and the user watches the display unit, the user sees that the first display content is presented on the first object and the K displayed objects are merged with the L physical objects, where K is an integer greater than or equal to 1, and L is an integer greater than or equal to 1.

* * * * *